US009426793B2

(12) United States Patent
Jeong et al.

(10) Patent No.: US 9,426,793 B2
(45) Date of Patent: Aug. 23, 2016

(54) APPARATUS AND METHOD FOR ALLOCATING RESOURCE USING CODEBOOK BASED ON RESOURCE SIZE AND BURST SIZE IN BROADBAND WIRELESS COMMUNICATION SYSTEM

(75) Inventors: Su-Ryong Jeong, Suwon-si (KR); Hyun-Kyu Yu, Seoul (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 12/943,277

(22) Filed: Nov. 10, 2010

(65) Prior Publication Data

US 2011/0110339 A1 May 12, 2011

(30) Foreign Application Priority Data

Nov. 10, 2009 (KR) ........................ 10-2009-0108226

(51) Int. Cl.
*H04B 7/216* (2006.01)
*H04W 72/04* (2009.01)
*H04L 5/00* (2006.01)

(52) U.S. Cl.
CPC .......... *H04W 72/042* (2013.01); *H04L 5/0091* (2013.01)

(58) Field of Classification Search
CPC ......... H04W 72/042; H04W 72/0406; H04W 72/04; H04W 24/10; H04W 72/0453; H04W 88/08; H04W 24/02; H04W 28/06; H04W 48/16; H04W 72/044; H04W 36/08; H04W 48/08; H04W 48/10; H04W 52/0206; H04W 52/0216; H04W 74/00; H04L 5/0053; H04L 5/0057; H04L 5/0048; H04L 5/0055; H04L 1/1861; H04B 7/0639; H04B 7/0417; H04B 7/0456; G06Q 10/06311; H04J 3/1694
USPC ....... 370/230, 252, 254, 312, 328, 329, 389, 370/390, 395.2, 400, 431, 432, 437; 455/509, 518
See application file for complete search history.

(56) References Cited

U.S. PATENT DOCUMENTS

2008/0025337 A1 1/2008 Smith et al.
2008/0037496 A1* 2/2008 Smith et al. .................. 370/340
2008/0117867 A1 5/2008 Yin et al.
(Continued)

FOREIGN PATENT DOCUMENTS

CN 101496423 A 7/2009
WO 2008/016280 A2 2/2008
(Continued)

*Primary Examiner* — Yemane Mesfin
*Assistant Examiner* — Mon Cheri Davenport
(74) *Attorney, Agent, or Firm* — Jefferson IP Law, LLP (57) ABSTRACT

An apparatus and method for allocating resources by using a codebook based on a resource size and a burst size in a broadband wireless communication system are provided. A method of operating a Mobile Station (MS) includes receiving a group configuration message from a Base Station (BS), wherein the group configuration message includes an N-bit first bitmap for indicating that M resource sizes are supported in the group among N resource sizes supported for group resource allocation, where M is less than N, and receiving a group resource allocation message from the BS, wherein the group resource allocation message includes a second bitmap for indicating a size of a resource allocated to a corresponding MS among MSs for which resource allocation is determined.

20 Claims, 7 Drawing Sheets

(56) References Cited

U.S. PATENT DOCUMENTS

| | | | |
|---|---|---|---|
| 2008/0298318 A1 | 12/2008 | Lee et al. | |
| 2008/0310363 A1* | 12/2008 | McBeath et al. | 370/330 |
| 2009/0154418 A1 | 6/2009 | Kang et al. | |
| 2011/0002273 A1* | 1/2011 | Youn et al. | 370/328 |
| 2011/0149807 A1* | 6/2011 | Yin et al. | 370/256 |
| 2012/0039289 A1* | 2/2012 | Kim et al. | 370/329 |
| 2012/0320837 A1* | 12/2012 | Kim | H04W 72/042 370/329 |
| 2014/0254545 A1 | 9/2014 | Novak et al. | |

FOREIGN PATENT DOCUMENTS

| | | |
|---|---|---|
| WO | 2008/033860 A2 | 3/2008 |
| WO | 2009/059428 A1 | 5/2009 |
| WO | 2009/113783 A2 | 9/2009 |

* cited by examiner

APPARATUS AND METHOD FOR ALLOCATING RESOURCE USING CODEBOOK BASED ON RESOURCE SIZE AND BURST SIZE IN BROADBAND WIRELESS COMMUNICATION SYSTEM

PRIORITY

This application claims the benefit under 35 U.S.C. §119(a) of a Korean patent application filed in the Korean Intellectual Property Office on Nov. 10, 2009 and assigned Serial No. 10-2009-0108226, the entire disclosure of which is hereby incorporated by reference.

BACKGROUND OF THE INVENTION

1. Field of the Invention

The present invention relates to a broadband wireless communication system. More particularly, the present invention relates to an apparatus and method for allocating resources by using a codebook based on a resource size and a burst size in a broadband wireless communication system.

2. Description of the Related Art

In the next generation communication system, also known as the 4th Generation (4G) communication system, research is actively in progress to provide a Quality of Service (QoS) with a data transfer speed of about 100 Mbps. An example of such a communication system is an Institute of Electrical and Electronics Engineers (IEEE) 802.16 system. The IEEE 802.16 system employs an Orthogonal Frequency Division Multiplexing (OFDM)/Orthogonal Frequency Division Multiple Access (OFDMA) scheme so that a broadband network may be supported in a physical channel.

In a broadband wireless communication system such as the IEEE 802.16 system, a Base Station (BS) allocates a resource to a Mobile Station (MS) to transmit and receive data. Further, the BS transmits to the MS a MAP message including resource allocation information, e.g., a location and size of the allocated resource, a modulation scheme, a coding rate, etc., through a downlink channel. In addition, when using a Multiple Input Multiple Output (MIMO) scheme, MIMO configuration information regarding the MIMO scheme in use is additionally included in the MAP message. In general, a MAP message including resource allocation information for uplink communication and a MAP message including resource allocation information for downlink communication are separately configured, and a unit of information necessary for one resource allocation is called a MAP Information Element (IE).

Transmission of the MAP message is necessary to perform communication. However, the MAP message occupies a radio resource in a competitive manner with respect to data. Therefore, an amount of radio resources available for data transmission decreases in proportion to radio resource consumption caused by transmission of the MAP message. Accordingly, the MAP message has to be designed to have minimum capacity while delivering all of the information required for resource allocation. Thus, there is a need for a method of minimizing overhead caused by the MAP message.

SUMMARY OF THE INVENTION

An aspect of the present invention is to address at least the above-mentioned problems and/or disadvantages and to provide at least the advantages described below. Accordingly, an aspect of the present invention is to provide an apparatus and method for decreasing overhead caused by resource allocation information in a broadband wireless communication system.

Another aspect of the present invention is to provide an apparatus and method for configuring resource allocation information with respect to a burst size and a resource size in a limited range in a broadband wireless communication system.

Still another aspect of the present invention is to provide an apparatus and method for generating a codebook for a group resource between a Base Station (BS) and a Mobile Station (MS) when using Group Resource Allocation (GRA) in a broadband wireless communication system.

Another aspect of the present invention is to provide an apparatus and method for configuring resource allocation information by using a codebook for a resource size and a burst size when using GRA in a broadband wireless communication system.

Yet another aspect of the present invention is to provide an apparatus and method for configuring a group resource configuration bitmap that lists all elements used by a BS to configure a codebook and for transmitting to an MS whether each element is used or not by using the configured bitmap, so as to share a codebook having a limited format between the BS and the MS in a broadband wireless communication system.

In accordance with an aspect of the present invention, a method of operating an MS for allocating resources to a plurality of MSs in a group in an Institute of Electrical and Electronics Engineers (IEEE) 802.16m system is provided. The method includes receiving a group configuration message from a BS, wherein the group configuration message includes an N-bit first bitmap for indicating that M resource sizes are supported in the group among N resource sizes supported for group resource allocation (where M is less than N), and receiving a group resource allocation message from the BS, wherein the group resource allocation message includes a second bitmap for indicating a size of a resource allocated to a corresponding MS among MSs for which resource allocation is determined.

In accordance with another aspect of the present invention, a method of operating a BS for allocating resources to a plurality of MSs in a group in an IEEE 802.16m system is provided. The method includes transmitting a group configuration message to the MSs, wherein the group configuration message includes an N-bit first bitmap for indicating that M resource sizes are supported in the group among N resource sizes supported for group resource allocation (where M is less than N), and transmitting a group resource allocation message to the MSs, wherein the group resource allocation message includes a second bitmap for indicating a size of a resource allocated to a corresponding MS among MSs for which resource allocation is determined.

In accordance with yet another aspect of the present invention, an MS apparatus for allocating resources to a plurality of MSs in a group in an IEEE 802.16m system is provided. The apparatus includes a receiver for receiving a group configuration message from a BS and for receiving a group resource allocation message from the BS, wherein the group configuration message includes an N-bit first bitmap for indicating that M resource sizes are supported in the group among N resource sizes supported for group resource allocation (where M is less than N), and wherein the group resource allocation message includes a second bitmap for indicating a size of a resource allocated to a corresponding MS among MSs for which resource allocation is determined.

In accordance with still another aspect of the present invention, a BS apparatus for allocating resources to a plurality of MSs in a group in an IEEE 802.16m system is provided. The apparatus includes a transmitter for transmitting a group configuration message to the MSs and for transmitting a group resource allocation message to the MSs, wherein the group configuration message includes an N-bit first bitmap for indicating that M resource sizes are supported in the group among N resource sizes supported for group resource allocation (where M is less than N), and wherein the group resource allocation message includes a second bitmap for indicating a size of a resource allocated to a corresponding MS among MSs for which resource allocation is determined.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention described below relates to a technique for decreasing overhead caused by resource allocation information in a broadband wireless communication system. Although an Orthogonal Frequency Division Multiplexing (OFDM)/Orthogonal Frequency Division Multiple Access (OFDMA)-based wireless communication system will be described hereinafter for example, the present invention may also apply to other types of wireless communication systems.

In the following description, a burst size denotes a bit size of information to be transmitted, and a resource size denotes the number of physical Resource Units (RUs) transmitted in practice.

Figure 1:
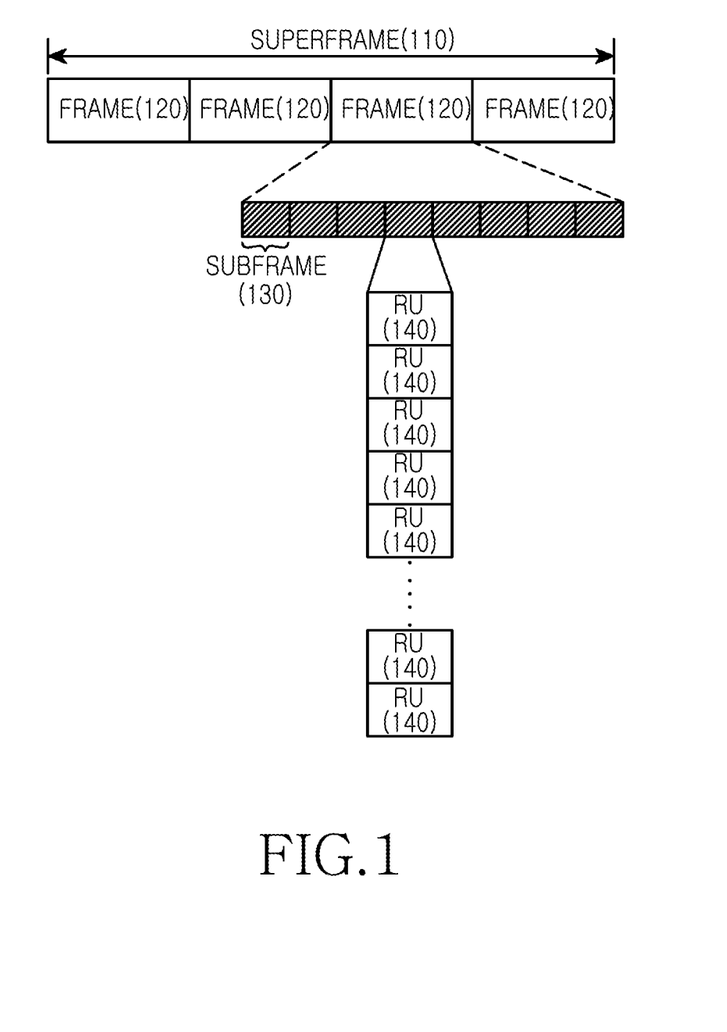
FIG. 1 illustrates a frame structure of a broadband wireless communication system according to an exemplary embodiment of the present invention.

FIG. 1 illustrates a frame structure of a broadband wireless communication system according to an exemplary embodiment of the present invention.

Referring to FIG. 1, one superframe 110 includes a plurality of frames 120. Each frame 120 includes a plurality of subframes 130 and each subframe 130 includes a plurality of OFDMA symbols. Allocation is performed on the resources in each subframe 130 wherein the resources are allocated in a unit of a Resource Unit (RU) 140. That is, an integer number of RUs 140 are allocated to a Mobile Station (MS) that performs communication with a Base Station (BS).

A MAP message, including MAP Information Elements (IEs) that include resource allocation information, is transmitted to the MS for each subframe 130. In this case, each MAP IE included in the MAP message is subjected to at least one of a Cyclic Redundancy Check (CRC) and scrambling using a unique sequence allocated to the MS that is designated to receive the MAP IE. Therefore, each MS has to identify the MAP IE that is designated for the MS by performing at least one of a CRC check and descrambling on each of the MAP IEs using the unique sequence allocated to the MS. Such MAP IE encoding is called separate coding.

The BS of the broadband wireless communication system allocates resources to the MSs, and transmits resource allocation information determined by the resource allocation to the MSs using the MAP IE or an additional control message. Herein, the MAP IE or the additional control message is transmitted to the MSs for each subframe 130. The MSs receive the MAP IE existing in each subframe 130 or the additional control message existing in a location confirmed by the MAP IE. The MSs confirm their reception data regions or transmission data regions and then transmit or receive data to or from the BS using the confirmed regions.

The resource allocation information includes a large amount of information, such as a location and size of the allocated resource, a modulation scheme, a coding rate, etc. The BS has to transmit the resource allocation information individually for resource allocation of each MS, and each MS has to receive its resource allocation information. As such, for resource allocation, the BS transmits the large amount of information to the MSs as the resource allocation information, and thus if resources are allocated to a plurality of separate MSs in one subframe 130, overhead increases and a data rate decreases due to the resource allocation information for each of the plurality of MSs.

In order to address the problem of separate resource allocation, Group Resource Allocation (GRA) is proposed. GRA is a technique for reducing overhead of resource allocation information by grouping one or more MSs into a group and by replacing MS identification information with a bitmap. When using GRA, the BS uses the bitmap to indicate whether a resource is allocated to an MS included in the group, and transmits to a corresponding MS only resource allocation information for at least one MS to which the resource is allocated. Therefore, when using GRA, the BS must inform the MSs included in the group a position of a bit corresponding to each MS in the bitmap. In other words, the BS has to report to the MSs in the group a mapping relation between a specific MS and a specific bit among bits of the bitmap.

Figure 2:
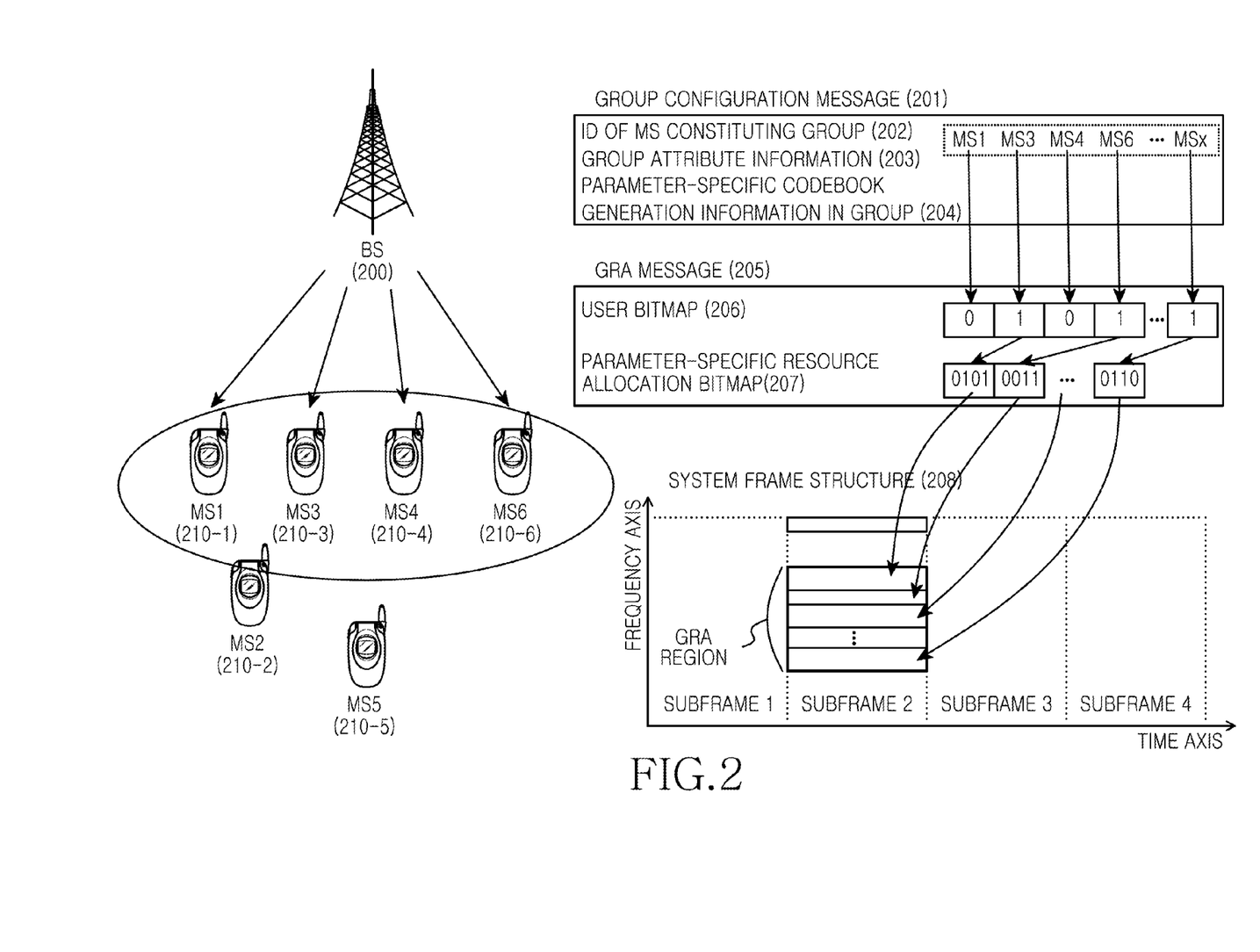
FIG. 2 illustrates an exemplary configuration of resource allocation information based on a codebook depending on Group Resource Allocation (GRA) in a broadband wireless communication system according to an exemplary embodiment of the present invention.

FIG. 2 illustrates a configuration of resource allocation information based on a codebook depending on GRA in a broadband wireless communication system according to an exemplary embodiment of the present invention.

Referring to FIG. 2, a BS 200 and MSs 210-1 to 210-6 perform a negotiation process related to a group configuration to configure the MSs 210-1, 210-3, 210-4, and 210-6 to be grouped into one group. Then, the BS 200 generates a parameter-specific codebook for the corresponding group. Herein, an exemplary parameter includes a resource size, a burst size, etc. The negotiation process is a process for reporting resource size candidates and burst size candidates to be used and for receiving information indicating whether the candidates are accepted.

Further, the BS 200 generates a group configuration message 201 and transmits the generated message to the MSs 210-1, 210-3, 210-4, and 210-6 included in the group. The group configuration message 201 includes IDentifiers (IDs) 202 of the MSs 210-1, 210-3, 210-4, and 210-6 constituting the group, an order of the MSs 210-1, 210-3, 210-4, and 210-6, group attribute information 203, and parameter-specific codebook generation information 204 of bitmaps to be transmitted at transmission of a GRA message 205. Herein, the order of the MSs 210-1, 210-3, 210-4, and 210-6 constituting the group is utilized as a location of a bit corresponding to each of the MSs 210-1, 210-3, 210-4, and 210-6 in a user bitmap 206 to be used in the GRA message 205 which will be transmitted at a later time. In addition, the MSs 210-1, 210-3, 210-4, and 210-6 constituting the group generate respective parameter-specific codebooks which are the same as that of the BS 200 on the basis of the parameter-specific codebook generation information 204.

After transmission of the group configuration message 201, when a GRA period arrives, the BS 200 allocates resources to the MSs 210-1, 210-3, 210-4, and 210-6 in the group, generates the GRA message 205, and transmits the generated message to the MSs 210-1, 210-3, 210-4, and 210-6 in the group. The GRA message 205 includes the user bitmap 206 and a parameter-specific resource allocation bitmap 207. The user bitmap 206 is a bitmap for expressing whether resources are allocated to the MSs 210-1, 210-3, 210-4, and 210-6 constituting the group according to the order of the MSs. Each of the MSs 210-1, 210-3, 210-4, and 210-6 in the group may determine whether a resource allocated to the MS exists in a corresponding subframe by confirming 1-bit information in a location of a bit corresponding to the MS in the bitmap. The parameter-specific resource allocation bitmap 207 is used only for the MSs 210-3 and 210-6 for which resource allocation is determined in the user bitmap 206 and is a bitmap for expressing a location, size, attribute, etc., of the resources allocated to the MSs 210-3 and 210-6 in that order. The resource allocation bitmap 207 is configured based on each parameter-specific codebook.

For example, in FIG. 2, 1st, 2nd, 3rd, and 4th bits of the user bitmap 206 respectively correspond to the MS1 210-1, the MS3 210-3, the MS4 210-4, and the MS6 210-6. Since the 2nd and 4th bits of the user bitmap 206 are set to '1', the MS3 210-3 and the MS6 210-6, which have received the GRA message 205, may recognize that resources are allocated to them. Similarly, since the 1st and 3rd bits of the user bitmap 206 are set to '0', the MS1 210-1 and the MS4 210-4 may recognize that resources are not allocated to them. Accordingly, the MS3 210-3 and the MS6 210-6 may recognize a location, size, attribute, etc., of resources allocated to them using the parameter-specific resource allocation bitmap 207.

Herein, an exemplary parameter may include a resource location or size, a Modulation and Coding Scheme (MCS) level, a burst size, Multiple Input Multiple Output (MIMO) antenna information, a pilot stream index, a data packet ID, etc. In the present invention, among the exemplary parameters, as a parameter for reporting a location and size of a resource and an MCS level thereof or a burst size to the MSs 210-3 and 210-6, the BS 200 transmits to the MSs 210-3 and 210-6 a resource allocation bitmap for the resource size and a resource allocation bitmap for the burst size using the resource size and the burst size. Herein, the resource allocation bitmap for the resource size and the resource allocation bitmap for the burst size may be used as one bitmap which represents the resource size and the burst size simultaneously.

Accordingly, the MSs 210-3 and 210-6, for which resource allocation is determined in the user bitmap 206, may recognize locations of resources allocated to the MSs by accumulating resource sizes of the resources allocated to the MSs in the group sequentially from a start position of a GRA region in a system frame structure 208. Further, the MSs 210-3 and 210-6 for which resource allocation is determined in the user bitmap 206 may recognize an MCS level of the resources allocated to the MSs by referring to a pre-defined or pre-generated codebook or may recognize the MCS level according to a method pre-defined in the system, on the basis of the burst size and the resource size of the resources allocated to the MSs.

In addition, for MIMO antenna information, pilot stream information, a data packet ID, etc., the BS may transmit codebook generation information to the MS to generate the same codebook between the BS and the MS. On the basis of the generated codebook, the MS may recognize the MIMO antenna information, the pilot stream information, the data packet ID, etc., to be used when a resource is allocated to the MS.

Herein, the group configuration message 201 may be transmitted in a group configuration MAP IE transmitted as a MAP IE included in a MAP message or in a message area located in a position defined in the system or defined in the MAP message. The GRA message 205 also may be transmitted in a GRA MAP IE transmitted as a MAP IE included in the MAP message or in a message area located in a position defined in the system or defined in the MAP message.

Figure 3:
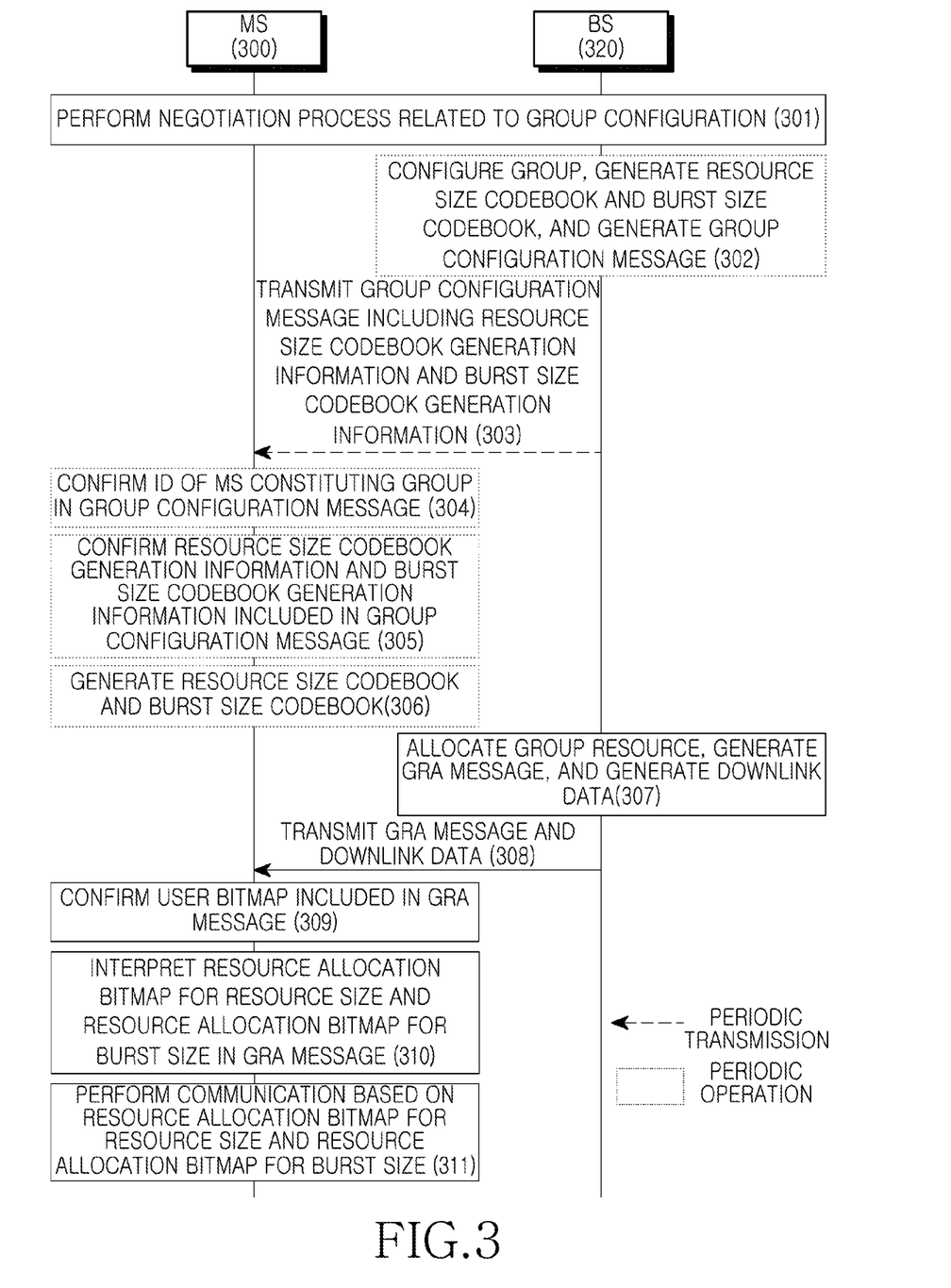
FIG. 3 illustrates a method of performing operations between a Base Station (BS) and a Mobile Station (MS) in order to use resource allocation information based on a codebook depending on GRA in a broadband wireless communication system according to an exemplary embodiment of the present invention.

FIG. 3 illustrates a method of performing operations between a BS and an MS in order to use resource allocation information based on a codebook depending on GRA in a broadband wireless communication system according to an exemplary embodiment of the present invention.

Referring to FIG. 3, an MS 300 and a BS 320 perform a negotiation process related to a group configuration in step 301.

Thereafter, the BS 320 configures one or more MSs, including the MS 300, into one group, generates a resource size codebook and a burst size codebook for the group, and generates a group configuration message including group configuration information in step 302. Herein, the group configuration information included in the group configuration message includes IDs of the MSs constituting the group and an order of the MSs, information on the group attribute, resource size codebook generation information, burst size codebook generation information, etc.

Thereafter, the BS 320 transmits the generated group configuration message to the MSs in the configured group in step 303.

Upon receiving the group configuration message, the MSs in the group determine whether they belong to the group by confirming ID information included in the group configuration message that indicates the IDs of the MSs constituting the group in step 304. If an MS determines that it belongs to the group, the MS confirms the resource size codebook generation information and burst size codebook generation information included in the group configuration message in step 305, and, on the basis of the confirmed information, generates and stores the resource size codebook and the burst size codebook in step 306.

When a GRA period arrives, the BS 320 determines MSs, for which GRA will be performed in a corresponding subframe through scheduling, and resources to be allocated to the respective MSs. Further, on the basis of the resource size codebook and the burst size codebook, the BS 320 generates a GRA message including GRA information. In addition, the BS 320 generates downlink data to be transmitted to the MSs by using a downlink subframe in step 307. Herein, the GRA information included in the GRA message includes a user bitmap which expresses whether resource allocation will be performed on the MSs constituting the group according to the order of the MSs, a resource allocation bitmap for a resource size and a resource allocation bitmap for a burst size for expressing the burst size and the resource size of resources allocated to the MSs according to the order of the MSs for which resource allocation is determined in the user bitmap. The resource allocation bitmap for the resource size and included in the GRA message has a format in which one or more codewords included in the resource size codebook are connected to one another. Likewise, the resource allocation bitmap for the burst size has a format in which one or more codewords included in the burst size codebook are connected to one another.

The BS 320 transmits the generated GRA message to the MSs in the configured group together with the generated downlink data in step 308.

Upon receiving the GRA message, each MS in the group determines whether resources are allocated to it in a corresponding subframe by configuring the user bitmap included in the GRA message in step 309. If it is determined that resources are allocated to an MS in the corresponding subframe, the MS in the group interprets the resource allocation bitmap for the resource size and the resource allocation bitmap for the burst size in the GRA message on the basis of the resource size codebook and burst size codebook generated in step 306 in step 310. Through the interpretation, the MS may recognize the burst size and the resource size of the allocated resources, and, on the basis of the recognized resource size and burst size, may recognize a location of the allocated resources and an MCS level.

On the basis of the interpreted resource allocation bitmaps for the resource size and the burst size, the MSs in the group perform communication with the BS 320 in step 311. That is, in downlink communication, the MSs in the group may receive downlink data for the MSs from the resource location and size recognized by using the resource allocation bitmap included in the GRA message received together. In uplink communication, the MSs in the group may transmit their uplink data according to the resource location and size recognized by the resource allocation bitmap.

The group configuration message for the GRA will be described below in more detail. As mentioned above, the group configuration message may include IDs of the MSs constituting the group and the order of the MSs, group attribute information, parameter-specific codebook generation information, and the like.

First, the IDs of the MSs constituting the group and the order of the MSs are delivered by continuously listing IDs of MSs belonging to the group in a designated part in the group configuration message. An example thereof is illustrated in Table 1 below.

TABLE 1

| | IDs of MSs constituting group | | | | | | |
|---|---|---|---|---|---|---|---|
| | #0 | #2 | #4 | #7 | #10 | #11 | #12 ... |
| resource allocation order/ bitmap interpretation order | 1 | 2 | 3 | 4 | 5 | 6 | 7 ... |

As shown in the example of Table 1, the IDs of the MSs constituting the group may be configured as MSs #0, #2, #4, #7, #10, #11, and #12, and a resource allocation order of the MSs constituting the group or a bitmap interpretation order may be the same as order of the MSs #0, #2, #4, #7, #10, #11, and #12.

Second, the group attribute information may be transmitted by being configured using a method agreed upon between the BS and the MS with respect to a parameter having the same value or a common value which does not require individual information transmission for the MSs in the group. According to system implementations and characteristics, the group attribute information may be omitted.

Third, the parameter-specific codebook generation information will be described. The parameter-specific codebook is a codebook of a corresponding parameter that is referenced by the MS to interpret a resource allocation bitmap when the resource allocation bitmap is received from the BS. The parameter-specific codebook defines a parameter value which represents respective bit values in the corresponding bitmap. Table 2 below illustrates an example of a method of interpreting a received bitmap when the MS receives respective bitmaps for a parameter called a resource size.

TABLE 2

| bitmap index | 0 | 1 | 2 | 3 | 4 | 5 | 6 | 7 |
|---|---|---|---|---|---|---|---|---|
| resource size codebook value | 1 | 2 | 3 | 4 | 5 | 6 | 7 | 8 |
| resource allocation bitmap value | 000 | 001 | 010 | 011 | 100 | 101 | 110 | 111 |

As illustrated in Table 2 above, the bitmap index 1 may be transmitted to the MS as a value of a resource allocation bitmap '001'. Upon receiving this value, the MS may interpret a resource size codebook value corresponding to the resource allocation bitmap as two resource sizes.

When using such a parameter-specific codebook, if a specific parameter may have a wide range of a parameter value or the number of cases of generating the specific parameter is too high, excessive overhead may occur since the number of bits for a corresponding parameter for each MS is too high even though transmission is performed using a bitmap. Therefore, exemplary embodiments of the present invention use a codebook having a limited format to reduce the overhead. For example, if the parameter called the resource size may have 64 parameter values (i.e., 1 to 64) in Table 2 above, when resources are allocated to N MSs in a corresponding subframe, 6 bits are required to express the values 1 to 64, and thus 6 bits×N, i.e., 6N bits, are required in total. However, if the parameter values of the corresponding parameter are replaced with 8 limited subsets, 3 bits are required to express 8 parameter values, and thus overhead may be decreased to 3 bits×N, i.e., 3N bits.

As an exemplary method of sharing the codebook having the limited format between the BS and the MS, the following four methods may be used.

In the first method, a limited codebook pre-defined in a system including a BS and an MS is used. In this case, the BS does not have to deliver a group configuration message with respect to codebook generation information, and the MS does not have to receive this message.

In the second method, by sharing and utilizing information on a set having one or more codebook subsets defined in the system including the BS and the MS, a group configuration message is used to transmit only a codebook index for representing a codebook subset suitable for a corresponding group with respect to a parameter. Thus, the BS and the MS interpret a bitmap by referring to the same codebook subset. Advantageously, an increase of overhead is not significant since the codebook index is transmitted to the MS only in case of initial group configuration information sharing, and adaptive GRA is possible in this method since a group attribute may be changed adaptively by changing the codebook index at a later time.

Table 3 below illustrates an example of a set including codebook subsets. Herein, the BS transmits to the MS a codebook index for representing a codebook subset suitable for a corresponding group with respect to a parameter called a resource size by using the group configuration message, and thereafter transmits a resource allocation bitmap to the MS on the basis of the codebook subset. In this case, MSs in the group may search for a codebook subset corresponding to the received codebook index and interpret a resource allocation bitmap on the basis of the found codebook subset.

TABLE 3

| code book index | syntax | value | | | | | | | |
|---|---|---|---|---|---|---|---|---|---|
| #0 | bitmap index | 0 | 1 | 2 | 3 | 4 | 5 | 6 | 7 |
| | resource size codebook value | 1 | 2 | 3 | 4 | 5 | 6 | 7 | 8 |
| | resource allocation bitmap value | 000 | 001 | 010 | 011 | 100 | 101 | 110 | 111 |
| #1 | bitmap index | 0 | 1 | 2 | 3 | 4 | 5 | 6 | 7 |
| | resource size codebook value | 9 | 10 | 11 | 12 | 13 | 14 | 15 | 16 |
| | resource allocation bitmap value | 000 | 001 | 010 | 011 | 100 | 101 | 110 | 111 |
| #2 | bitmap index | 0 | 1 | 2 | 3 | 4 | 5 | 6 | 7 |
| | resource size codebook value | 1 | 2 | 3 | 4 | 5 | 6 | 7 | 9 |
| | resource allocation bitmap value | 000 | 001 | 010 | 011 | 100 | 101 | 110 | 111 |
| #3 | bitmap index | 0 | 1 | 2 | 3 | 4 | 5 | 6 | 7 |
| | resource size codebook value | 1 | 2 | 3 | 4 | 5 | 6 | 8 | 10 |
| | resource allocation bitmap value | 000 | 001 | 010 | 011 | 100 | 101 | 110 | 111 |
| ... | ... | ... | ... | ... | ... | ... | ... | ... | ... |

As illustrated in Table 3 above, the BS may transmit to the MS a codebook index #1 which indicates a codebook subset suitable for a corresponding group with respect to the parameter called the resource size by using the group configuration message, and thereafter may transmit a bitmap index 1 to the MS by using a value of a resource allocation bitmap '001' on the basis of the codebook subset. Upon receiving this value, the MS may search for a codebook subset corresponding to the received codebook index #1, and may interpret that resources allocated to the MS have 10 resource sizes by searching for a resource size codebook value corresponding to the resource allocation bitmap '001' value on the basis of the found codebook subset.

In the third method, the group configuration message is used to configure a group resource configuration bitmap which lists all elements capable of configuring a codebook of a corresponding parameter, and whether to use each element is transmitted by using the configured group resource configuration bitmap.

Table 4 below illustrates an example of the group resource configuration bitmap.

TABLE 4

| resource size codebook value | 1 | 2 | 3 | 4 | 5 | 6 | 7 | 8 |
|---|---|---|---|---|---|---|---|---|
| resource size bitmap value | 0 | 0 | 1 | 0 | 1 | 1 | 1 | 0 |
| resource allocation bitmap value | N/A | N/A | 000 | N/A | 001 | 010 | 011 | N/A |
| resource size codebook value | 9 | 10 | 11 | 12 | 13 | 14 | 15 | 16 |
| resource size bitmap value | 1 | 0 | 1 | 0 | 1 | 0 | 1 | 0 |
| resource allocation bitmap value | 100 | N/A | 101 | N/A | 110 | N/A | 111 | N/A |

As illustrated in Table 4 above, when the BS transmits to the MS a 16-bit bitmap of '0010111010101010' using the group resource configuration bitmap, the MS may confirm that elements constituting a codebook of a parameter called a resource size has 3 (i.e., 000), 5 (i.e., 001), 6 (i.e., 010), 7 (i.e., 011), 9 (i.e., 100), 11 (i.e., 101), 13 (i.e., 110), and 15 (i.e., 111) resource sizes using the group resource configuration bitmap, and may generate a codebook configured with the elements. Accordingly, the BS and the MS share the same codebook. Table 5 below illustrates an example of the codebook shared between the BS and the MS using the group resource configuration bitmap of Table 4 above.

TABLE 5

| bitmap index | 0 | 1 | 2 | 3 | 4 | 5 | 6 | 7 |
|---|---|---|---|---|---|---|---|---|
| resource size codebook value | 3 | 5 | 6 | 7 | 9 | 11 | 13 | 15 |
| resource allocation bitmap value | 000 | 001 | 010 | 011 | 100 | 101 | 110 | 111 |

In the fourth method, a codebook itself of a corresponding parameter is transmitted in every group configuration message transmission. In this method, the BS transmits a resource size codebook of a resource corresponding to each bitmap index to the MS in every group configuration message transmission, and transmits the resource allocation bitmap to the MS on the basis of the resource size codebook. In this case, the MSs in the group may interpret the resource allocation bitmap on the basis of the recently received resource size codebook, and may recognize a size of the resource allocated to the MSs. Table 6 below illustrates an example of the resource size codebook of the resource corresponding to each bitmap index.

TABLE 6

| bitmap index | 0 | 1 | 2 | 3 | 4 | 5 | 6 | 7 |
|---|---|---|---|---|---|---|---|---|
| resource size codebook value | 1 | 4 | 6 | 7 | 8 | 10 | 12 | 14 |
| resource allocation bitmap value | 000 | 001 | 010 | 011 | 100 | 101 | 110 | 111 |

Herein, the four exemplary methods for sharing the codebook having the limited format between the BS and the MS may be managed independently or may be managed by combining one or more methods. For example, if a parameter called a resource size may have 64 parameter values, i.e., 1 to 64, the BS may negotiate with the MS to use only a pre-defined format, e.g., only parameter values 1 to 16, by using the first method, and may report to the MS a method of configuring a codebook for the negotiated parameter values 1 to 16 by using the third method.

Figure 4:
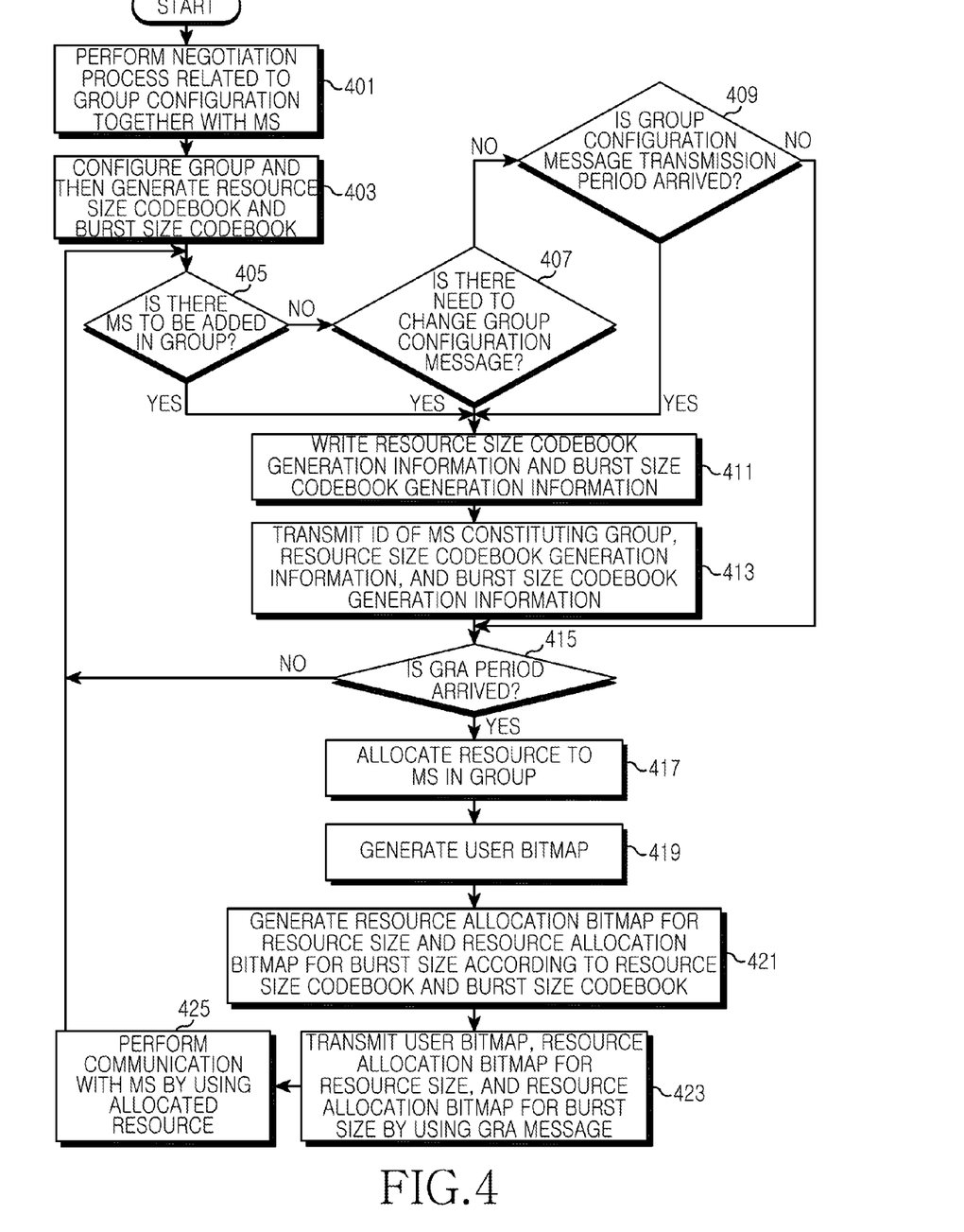
FIG. 4 is a flowchart illustrating a method of operating a BS for using resource allocation information based on a codebook depending on GRA in a broadband wireless communication system according to an exemplary embodiment of the present invention.

FIG. 4 is a flowchart illustrating a method of operating a BS for using resource allocation information based on a codebook depending on GRA in a broadband wireless communication system according to an exemplary embodiment of the present invention.

Referring to FIG. 4, the BS and an MS perform a negotiation process related to a group configuration in step 401. According to the negotiation process, in step 403, the BS configures one or more MSs including the MS into one group, determines a group attribute, and generates a resource size codebook and a burst size codebook for the group.

Herein, the MSs constituting the group may also change at a later time by performing MS addition/deletion, and a group attribute included in the group configuration message or codebook generation information of a specific parameter may also change. Upon detection of such a change, the BS has to generate a new group or write new group attribute information or write new codebook generation information for the specific parameter, and has to transmit the generated information to the MS by using the group configuration message. Further, even if there is nothing to change in the MSs in the group or the group configuration message, the group configuration message has to be newly generated to be transmitted to the MS when a group configuration message transmission period arrives.

Therefore, upon configuration of the group, the BS determines whether there is an MS to be added to the group in step 405.

If it is determined in step 405 that the MS to be added in the group exists, the BS writes resource size codebook generation information and burst size codebook generation information in step 411. In step 413, the BS generates a group configuration message including the group configuration information and transmits the generated message to the MSs in the group. Herein, the group configuration information included in the group configuration message includes IDs of the MSs constituting the group and an order of the MSs, group attribute information, resource size codebook generation information, burst size codebook generation information, etc.

Otherwise, if it is determined in step 405 that there is no MS to be added in the group, the BS determines whether there is a need to change the group configuration message previously transmitted to the MSs in the group in step 407.

If it is determined in step 407 that there is a need to change the group configuration message previously transmitted to the MSs in the group, the BS proceeds to step 411 and performs the subsequent steps.

Otherwise, if it is determined in step 407 that there is nothing to change in the group configuration message previously transmitted to the MSs in the group, the BS determines whether a group configuration message transmission period arrives in step 409.

If it is determined in step 409 that the group configuration message transmission period arrives, the BS proceeds to step 411 and performs the subsequent steps.

Otherwise, if it is determined in step 409 that the group configuration message transmission period does not arrive, the BS proceeds to step 415 and performs the subsequent steps.

In step 415, the BS determines whether a GRA period arrives.

If it is determined in step 415 that the GRA period does not arrive, the BS returns to step 405 and performs the subsequent steps.

Otherwise, if it is determined in step 415 that the GRA period arrives, the BS determines MSs for which group resource allocation will be performed in a corresponding subframe through resource allocation on the MSs in the group and resources to be allocated to the respective MSs in step 417. In step 419, the BS generates a user bitmap by expressing whether to perform resource allocation for the MSs in the group according to the order of the MSs.

In step 421, the BS generates a resource allocation bitmap for a resource size and a resource allocation bitmap for a burst size by expressing the burst size and the resource size of a resource allocated to a corresponding MS on the basis of the generated resource size codebook and burst size codebook only for the MSs for which resource allocation is determined in the user bitmap according to the order of the MSs.

In step 423, the BS generates a GRA message and transmits the generated message to the MSs in the group. The GRA message includes the generated user bitmap, the resource allocation bitmap for the resource size, and the resource allocation bitmap for the burst size. Herein, the BS generates downlink data to be transmitted to the MSs through a downlink subframe, and transmits the generated downlink data to the MSs in the group together with the generated GRA message.

In step 425, the BS performs communication with the corresponding MS in the group using the resource allocated to the MS in the group on the basis of the resource allocation bitmap for the resource size and the resource allocation bitmap for the burst size. Then, returning to step 405, the subsequent steps are repeated. That is, in downlink communication, the BS transmits downlink data or traffic to the MS by using a downlink GRA region, and in uplink communication, the BS receives data or traffic from the MS using an uplink GRA region.

Figure 5:
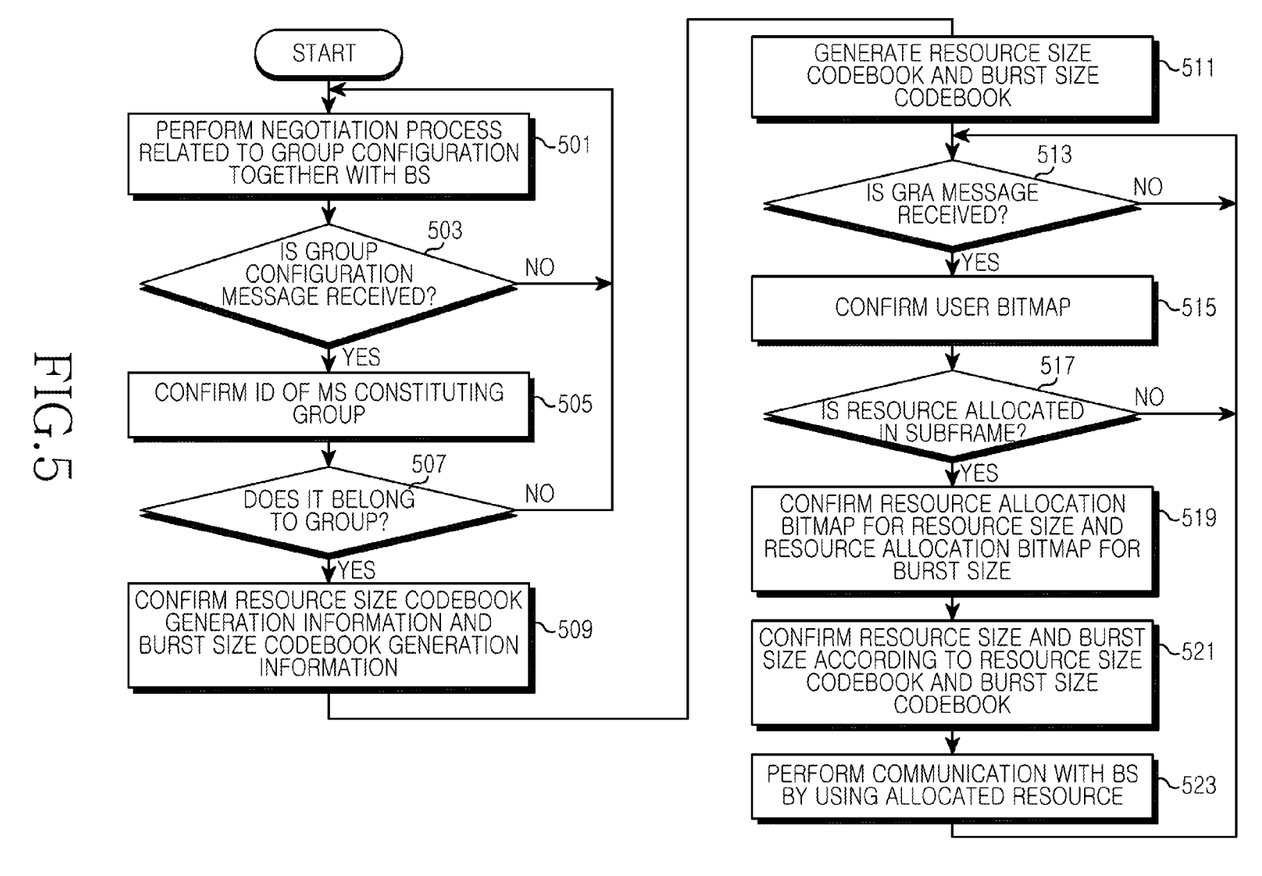
FIG. 5 is a flowchart illustrating a method of operating an MS for using resource allocation information based on a codebook depending on GRA in a broadband wireless communication system according to an exemplary embodiment of the present invention.

FIG. 5 is a flowchart illustrating a method of operating an MS for using resource allocation information based on a codebook depending on GRA in a broadband wireless communication system according to an exemplary embodiment of the present invention.

Referring to FIG. 5, the MS and a BS perform a negotiation process related to a group configuration in step 501.

In step 503, the MS determines whether a group configuration message is received from the BS. Herein, the group configuration message includes IDs of MSs constituting a group and an order of the MSs, group attribute information, resource size codebook generation information, and burst size codebook generation information.

If it is determined in step 503 that the group configuration message is not received from the BS, returning to step 501, the subsequent steps are repeated.

Otherwise, if it is determined in step 503 that the group configuration message is received from the BS, proceeding to step 505, the MS confirms information regarding the IDs of the MSs constituting the group in the received group configuration message. In step 507, the MS determines whether the MS belongs to the group by using the confirmed ID information of the MSs in the group.

If it is determined in step 507 that the MS does not belong to the group, returning to step 501, the subsequent steps are repeated.

Otherwise, if it is determined in step 507 that the MS belongs to the group, proceeding to step 509, the MS confirms resource size codebook generation information and burst size codebook generation information included in the group configuration message. In step 511, the MS generates and stores a resource size codebook and a burst size codebook on the basis of the confirmed information.

In step 513, the MS determines whether a GRA message is received. Herein, the GRA message includes a user bitmap, a resource allocation bitmap for a resource size, and a resource allocation bitmap for a burst size. The user bitmap is a bitmap in which whether to perform resource allocation for the MSs constituting the group is expressed according to the order of the MSs. The resource allocation bitmap for the resource size and the resource allocation bitmap for the burst size are bitmaps in which the burst size and the resource size of the resource allocated to a corresponding MS is expressed only for the MSs for which resource allocation is determined in the user bitmap according to the order of the MSs. The GRA message is received by the MS using a downlink subframe together with downlink data.

If it is determined in step 513 that the GRA message is received, proceeding to step 515, the MS confirms the user bitmap included in the GRA message. In step 517, the MS determines whether a resource is allocated to the MS in a corresponding subframe by using the confirmed user bitmap.

If it is determined in step 517 that the resource is allocated to the MS in the corresponding subframe, proceeding to step 519, the MS confirms the resource allocation bitmap for the resource size and the resource allocation bitmap for the burst size in the GRA message. In step 521, on the basis of the generated resource size codebook and burst size codebook, the MS confirms the burst size and the resource size of the resource allocated to the MS by interpreting the confirmed resource allocation bitmaps for the resource size and the burst size. Herein, the MS may recognize a location of the resource allocated to the MS and an MCS level on the basis of the confirmed resource size and burst size.

In step 523, the MS performs communication with the BS by using the resource allocated to the MS on the basis of the confirmed resource size and burst size. Then, returning to step 513, the subsequent steps are repeated. That is, in downlink communication, the MS receives downlink data or traffic from the BS by using a downlink GRA region, and in uplink communication, the MS transmits data or traffic to the BS by using an uplink GRA region.

Otherwise, if it is determined in step 513 that the GRA message is not received or if it is determined in step 517 that the resource is not allocated to the MS in the corresponding subframe, the BS returns to step 513 and performs the subsequent steps.

Figure 6:
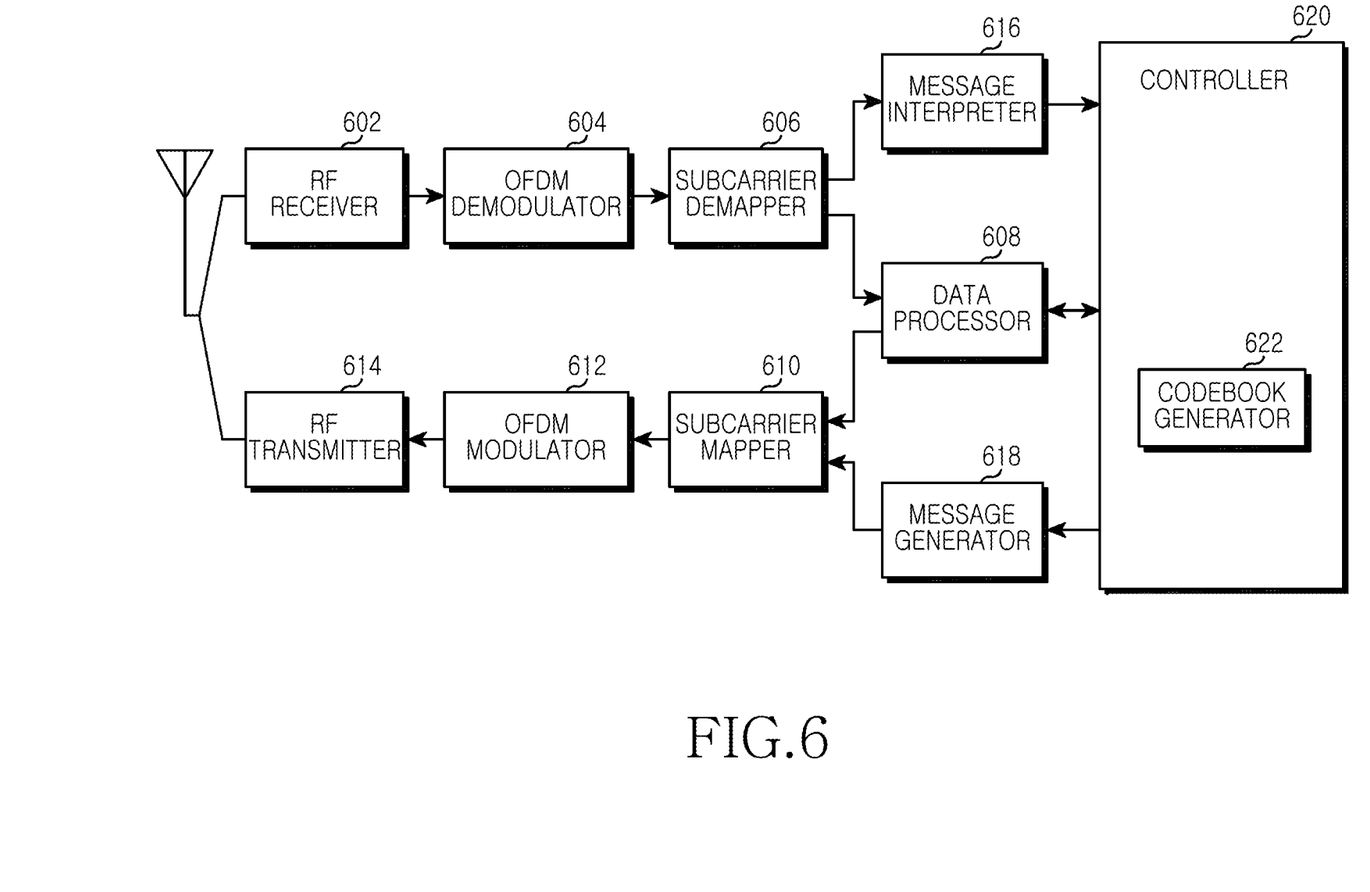
FIG. 6 is a block diagram of an MS in a broadband wireless communication system according to an exemplary embodiment of the present invention.

FIG. 6 is a block diagram of an MS in a broadband wireless communication system according to an exemplary embodiment of the present invention.

Referring to FIG. 6, the MS includes a Radio Frequency (RF) receiver 602, an OFDM demodulator 604, a subcarrier demapper 606, a data processor 608, a subcarrier mapper 610, an OFDM modulator 612, an RF transmitter 614, a message interpreter 616, a message generator 618, and a controller 620.

The RF receiver 602 converts an RF signal received through an antenna into a base-band signal. The OFDM demodulator 604 divides the base-band signal in an OFDM symbol unit, removes a Cyclic Prefix (CP), and thereafter restores signals for respective subcarriers by performing a Fast Fourier Transform (FFT) operation. The subcarrier demapper 606 divides the signals for the respective subcarriers in a processing unit, and provides data signals to the data processor 608 and provides message signals to the message interpreter 616. The data processor 608 restores a data reception bit-stream by performing demodulation and channel decoding on the data signals, and generates the data signals by performing channel coding and modulation on a transmission data bit-stream. The subcarrier mapper 610 maps the data signals provided from the data processor 608 and the message signals provided from the message generator 618 to the subcarriers. The OFDM modulator 612 converts signals mapped to the subcarriers into time-domain signals by performing an Inverse FFT (IFFT) operation, and configures OFDM symbols by inserting the CP. The RF transmitter 614 up-converts the OFDM symbols into an RF signal, and thereafter transmits the RF signal through the antenna.

The message interpreter 616 restores a message bit-stream from the message signals received from a BS. Further, the message interpreter 616 confirms information included in the message by interpreting the message bit-stream, and provides the confirmed information to the controller 620. More particularly, the message interpreter 616 interprets messages for the negotiation process related to a group configuration to be exchanged with the BS. Furthermore, the message interpreter 616 interprets a group configuration message received from the BS to determine whether the MS belongs to a corresponding group. If it is determined that the MS belongs to the corresponding group, the message interpreter 616 extracts resource size codebook generation information and burst size codebook generation information from the group configuration message, and provides the extracted information to the controller 620. In this case, a codebook generator 622 of the controller 620 generates a resource size codebook and a burst size codebook on the basis of the resource size codebook generation information and the burst size codebook generation information. In addition, the message interpreter 616 interprets a GRA message received from the BS to determine whether a resource is allocated to the MS in a corresponding subframe. If it is determined that the resource is allocated to the MS in the corresponding subframe, the message interpreter 616 confirms the resource allocated to the MS by interpreting a resource allocation bitmap for a resource size and a resource allocation bitmap for a burst size in the GRA message on the basis of the resource size codebook and burst size codebook provided from the codebook generator 622 of the controller 620.

The message generator 618 configures a message bit-stream including information provided from the controller 620, and generates physical message signals from the message bit-stream.

The controller 620 controls overall functions of the MS. For example, the controller 620 controls the subcarrier demapper 606 to extract data signals from the allocated resource confirmed by the message interpreter 616, and controls the subcarrier mapper 610 to transmit the data signals by using the allocated resource. Further, the controller 620 performs a process corresponding to information confirmed by the message interpreter 616, and provides information included in a transmission message to the message generator 618.

Figure 7:
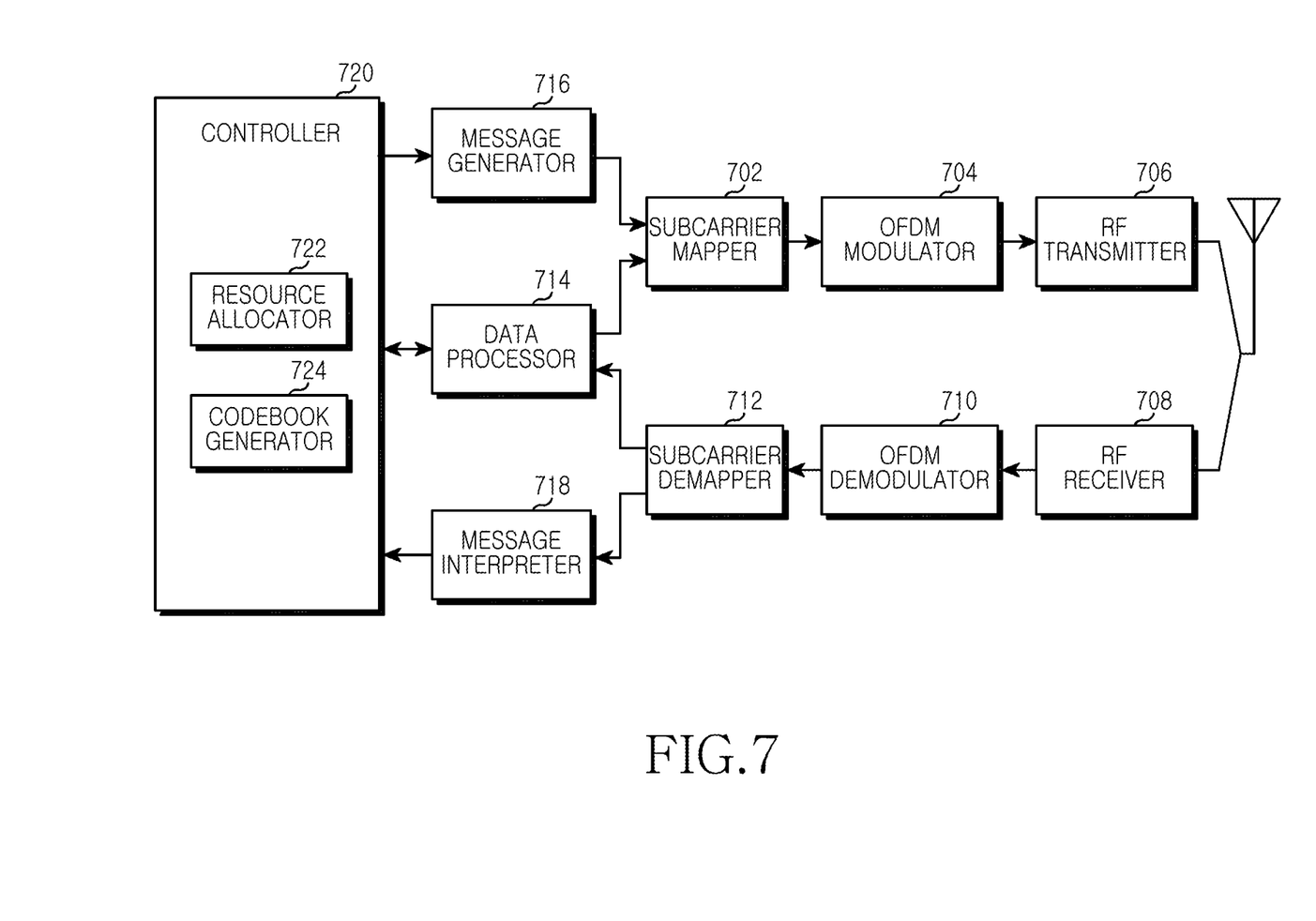
FIG. 7 is a block diagram of a BS in a broadband wireless communication system according to an exemplary embodiment of the present invention.

FIG. 7 is a block diagram of a BS in a broadband wireless communication system according to an exemplary embodiment of the present invention.

Referring to FIG. 7, the BS includes a subcarrier mapper 702, an OFDM modulator 704, an RF transmitter 706, an RF receiver 708, an OFDM demodulator 710, a subcarrier demapper 712, a data processor 714, a message generator 716, a message interpreter 718, and a controller 720.

The subcarrier mapper 702 maps data signals provided from the data processor 714 and message signals provided from the message generator 716 to subcarriers. The OFDM modulator 704 converts signals mapped to the subcarriers into time-domain signals by performing an IFFT operation, and configures OFDM symbols by inserting a CP. The RF transmitter 706 up-converts the OFDM symbols into an RF signal, and thereafter transmits the RF signal through an antenna. The RF receiver 708 converts the RF signal received through the antenna into a base-band signal. The OFDM demodulator 710 divides the base-band signal in an OFDM symbol unit, removes a CP, and thereafter restores signals for the respective subcarriers by performing an FFT operation. The subcarrier demapper 712 divides the signals for the respective subcarriers in a processing unit, and provides data signals to the data processor 714 and provides message signals to the message interpreter 718. The data processor 714 restores a data reception bit-stream by performing demodulation and channel decoding on the data signals, and generates transmission data signals by performing channel coding and modulation on a transmission data bit-stream.

The message interpreter 718 restores a message bit-stream from message signals received from an MS. Further, the message interpreter 718 confirms information included in the message by interpreting the message bit-stream, and provides the confirmed information to the controller 720.

The message generator 716 configures the message bit-stream including information provided from the controller 720, and generates physical message signals from the message bit-stream. More particularly, the message generator 716 generates messages for a negotiation process related to a group configuration to be exchanged with the MS. Further, by including IDs of MSs constituting one group, group attribute information, resource size codebook generation information, and burst size codebook generation information provided from a codebook generator 724, the message generator 716 generates a group configuration message to be transmitted to the MSs included in the group. Furthermore, the message generator 716 generates a GRA message to be transmitted to the MSs in the group by including a user bitmap, a resource allocation bitmap for a resource size, and a resource allocation bitmap for a burst size provided from a resource allocator 722.

The controller 720 controls overall functions of the BS. For example, the controller 720 controls the subcarrier demapper 712 to extract MS-specific data signals according to a resource allocation result, and controls the subcarrier mapper 702 to map the MS-specific data signals according to the resource allocation result. Further, the controller 720 performs a process corresponding to information confirmed by the message interpreter 718, and provides information included in a transmission message to the message generator 716.

The resource allocator 722 of the controller 720 allocates resources to the MSs according to either separate resource allocation or GRA. Further, the resource allocator 722 generates a user bitmap by expressing whether to perform resource allocation for the MSs constituting the group in a bitmap according to an order of the MSs on the basis of the GRA result. Furthermore, only for MSs for which resource allocation is determined in the user bitmap, the resource allocator 722 generates the resource allocation bitmap for the resource size and the resource allocation bitmap for the burst size by expressing sizes of bursts and resources allocated to the corresponding MSs on the basis of the resource size codebook and the burst size codebook according to the order of the MSs. In addition, the resource allocator 722 provides the message generator 716 with the generated user bitmap, the resource allocation bitmap for the resource size, and the resource allocation bitmap for the burst size.

The codebook generator 724 of the controller 720 configures a plurality of MSs into one group, determines a group attribute, and generates a resource size codebook and a burst size codebook for the group. Further, the codebook generator 724 generates resource size codebook generation information and burst size codebook generation information on the basis of the generated resource size codebook and burst size codebook, and provides the message generator 716 with IDs of the MSs constituting one group, group attribute information, and the generated resource size codebook generation information and burst size codebook generation information.

According to exemplary embodiments of the present invention, resource allocation information is configured on the basis of a codebook for indicating a resource size and a burst size in a limited range in a broadband wireless communication system. Therefore, overhead caused by the resource allocation information may be minimized.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of operating a mobile station (MS) in a wireless communication system, the method comprising:
receiving, from a base station (BS), a first message for a group configuration, wherein the first message includes a bitmap for indicating resource sizes supported in a group where the MS belongs, among a plurality of resource size candidates; and
receiving, from the BS, a second message for a group resource allocation, wherein the second message includes a user information for indicating at least one MS scheduled in the group, and a resource assignment information for indicating a resource size for the at least one MS among the resource sizes.

2. The method of claim 1, wherein the bitmap includes bits as many as a number of the plurality of resource size candidates.

3. The method of claim 1, wherein, if a n-th bit of the bitmap is set to '1', the bitmap informs that a resource size corresponding to the n-th bit is supported in the group.

4. The method of claim 1, wherein the resource assignment information further indicates at least one burst size allocated for the scheduled at least one MS.

5. The method of claim 4, further comprising:
identifying a burst size and a resource size of a resource allocated to the MS based on the resource assignment information; and
determining at least one of a position of the resource and a modulations and coding scheme (MCS) level based on the burst size and the resource size.

6. A method for operating a base station (BS) in a wireless communication system, the method comprising:
transmitting a first message for a group configuration; and
transmitting a second message for a group resource allocation,
wherein the first message includes a bitmap for indicating resource sizes supported in a group where a plurality of mobile stations (MSs) belongs, among a plurality of resource size candidates, and
wherein the second message includes a user information for indicating at least one MS scheduled in the group, and a resource assignment information for indicating a resource size for the at least one MS among the resource sizes.

7. The method of claim 6, wherein the bitmap includes bits as many as a number of the plurality of resource size candidates.

8. The method of claim 6, wherein, if a n-th bit of the bitmap is set to '1', the bitmap informs that a resource size corresponding to the n-th bit is supported in the group.

9. A mobile station (MS) in a wireless communication system, the MS comprising:
a receiver configured to receive, from a base station (BS), a first message for a group configuration and a second message for and a group resource allocation,
wherein the first message includes a bitmap for indicating resource sizes supported in a group where the MS belongs, among a plurality of resource size candidates, and
wherein the second message includes a user information for indicating at least one MS scheduled in the group, and a resource assignment information for indicating a resource size for the at least one MS among the resource sizes.

10. The MS of claim 9, wherein the bitmap includes bits as many as a number of the plurality of resource size candidates.

11. The MS of claim 9, wherein if a n-th bit of the bitmap is set to '1', the bitmap informs that a resource size corresponding to the n-th bit is supported in the group.

12. The MS of claim 9, wherein the resource assignment information further indicates at least one burst size allocated for the scheduled at least one MS.

13. The apparatus of claim 12, further comprising:
a controller configured to:
identify a burst size and a resource size of a resource allocated to the MS based on the resource assignment information, and
determine at least one of a position of the resource and a modulations and coding scheme (MCS) level based on the based on the burst size and the resource size.

14. A base station (BS) in a wireless communication system, the BS comprising:
a transmitter configured to
transmit a first message for a group configuration, and a second message for a group resource allocation,
wherein the first message includes a bitmap for indicating resource sizes supported in a group where a plurality of mobile stations (MSs) belongs, among a plurality of resource size candidates, and
wherein the second message includes a user information for indicating at least one MS scheduled in the group, and a resource assignment information for indicating a resource size for the at least one MS among the resource sizes.

15. The BS of claim 14, wherein the bitmap includes bits as many as a number of the plurality of resource size candidates.

16. The BS of claim 14, wherein, if a n-th bit of the bitmap is set to '1', the bitmap informs that a resource size corresponding to the n-th bit is supported in the group.

17. The method of claim 6, wherein the resource assignment information further indicates at least one burst size allocated for the scheduled at least one MS.

18. The method of claim 6, further comprising:
if a MS is added to the group, transmitting another first message.

19. The BS of claim 14, wherein the resource assignment information further indicates at least one burst size allocated for the scheduled at least one MS.

20. The BS of claim 14, further comprising:
a controller configured to control the transmitter to transmit another first message, if a MS is added to the group.

* * * * *